(12) United States Patent
Reams, III

(10) Patent No.: US 8,971,309 B1
(45) Date of Patent: Mar. 3, 2015

(54) UNIVERSAL VOICE OVER PACKET PROTOCOL CALL STRUCTURE

(75) Inventor: Orin Paul Reams, III, Charles Town, WV (US)

(73) Assignee: Sprint Communications Company L.P., Overland Park, KS (US)

( * ) Notice: Subject to any disclaimer, the term of this patent is extended or adjusted under 35 U.S.C. 154(b) by 1972 days.

(21) Appl. No.: 11/209,441

(22) Filed: Aug. 23, 2005

(51) Int. Cl.
- *G01R 31/08* (2006.01)
- *G06F 11/00* (2006.01)
- *G08C 15/00* (2006.01)
- *H04L 12/28* (2006.01)

(52) U.S. Cl.
USPC .......................................... 370/352; 370/356

(58) Field of Classification Search
USPC .................. 370/352–356; 379/67.1
See application file for complete search history.

(56) References Cited

U.S. PATENT DOCUMENTS

| | | | |
|---|---|---|---|
| 6,813,264 B2* | 11/2004 | Vassilovski | 370/352 |
| 2001/0039561 A1* | 11/2001 | Cho | 709/200 |
| 2003/0115335 A1* | 6/2003 | Yoshida et al. | 709/228 |
| 2004/0006623 A1* | 1/2004 | Gourraud et al. | 709/227 |
| 2005/0047423 A1* | 3/2005 | Kaul et al. | 370/401 |
| 2005/0074109 A1* | 4/2005 | Hanson et al. | 379/207.08 |
| 2005/0094621 A1* | 5/2005 | Acharya et al. | 370/352 |
| 2005/0105464 A1* | 5/2005 | Acharya et al. | 370/229 |
| 2005/0267968 A1* | 12/2005 | Fearing et al. | 709/224 |
| 2005/0286498 A1* | 12/2005 | Rand et al. | 370/352 |
| 2007/0036143 A1* | 2/2007 | Alt et al. | 370/352 |

OTHER PUBLICATIONS

J. Rosenberg et al. RFC 3261: SIP: Session Initiation Protocol, Jun. 2002, IETF.*

* cited by examiner

*Primary Examiner* — Nafiz E Hoque

(57) ABSTRACT

Methods and systems for providing a universal voice over packet (VOP) protocol call structure. The present invention allows VOP calls to be made across different service providers without traversing through a public switched telephone network (PSTN). The calls occur as On-Net calls. Email addresses may be used to call different parties. In addition, telephone numbers may be used to reach parties in the PSTN through an Off-Net carrier causing Off-Net calls.

13 Claims, 3 Drawing Sheets

UNIVERSAL VOICE OVER PACKET PROTOCOL CALL STRUCTURE

CROSS-REFERENCE TO RELATED APPLICATIONS

Not applicable

STATEMENT REGARDING FEDERALLY SPONSORED RESEARCH OR DEVELOPMENT

Not applicable.

TECHNICAL FIELD

This invention relates to the field of voice calls in a packet network.

BACKGROUND OF THE INVENTION

As more and more people embrace the Internet as part of their daily lives, it is only a matter of time before the traditional analog telephones are replaced for voice over packet (VOP) telephony. VOP would include voice over interne protocol (VOIP), voice over asynchronous transfer mode (ATM), voice over frame relay, and VOIP over wireless local area network (LAN). It would also include other protocols where voice would be transported over the protocol.

Numerous service providers use VOP to provide calling plans to their customers for both On-Net and Off-Net calls. These providers charge a fee for various calling plans. An On-Net call refers to calls that originate from, and terminate on, a packet endpoint such as an IP endpoint. An On-Net call remains in a packet network for its duration and does not require a connection to a public switched telephone network (PSTN). An Off-Net call refers to calls that originate from a packet endpoint but terminate on the PSTN.

The problem with today's VOP service is the lack of interconnection between the various service providers, and the continuing role of the PSTN. If a customer of one service provider wanted to call a customer of another service provider, the call would be VOP at either end but would still traverse the PSTN to make the complete connection. Because the PSTN market is regulated and subject to special tariffs and taxes, there is minimal savings to use VOP except when calling a customer served by the same service provider. Usually, two customers served by the same service provider may make a VOP call that stays as an On-Net call.

A solution is needed that would provide interconnectivity of the various VOP service providers bypassing the PSTN but using the existing architecture and infrastructure of the Internet. Customers would not have to register with more than one service provider and would be able to make VOP On-Net calls even to customers served by a different service provider.

SUMMARY OF THE INVENTION

This disclosure describes, among other things, methods and systems for providing a universal voice over packet protocol call structure.

In accordance with the present invention, a method for establishing inter-vendor and inter-carrier voice over packet (VOP) calls without using a public switched telephone network (PSTN) is provided that includes receiving a called party's email address from a calling party at a computing device in a service provider network. A query of the email address is performed by the computing device to obtain a record of computing devices in other service provider networks. The computing devices are communicated with using the record to request a VOP session with the called party's email address. The VOP session is established by the computing device or the other computing devices without traversing the PSTN.

In another aspect, a method for establishing inter-vendor and inter-carrier voice over packet (VOP) calls without using a public switched telephone network (PSTN) is provided that includes receiving a request to initiate a VOP session at a first computing device that communicates between VOP networks. The first computing device is a member of a first service provider packet network. An internet protocol (IP) address, a domain name, a VOP protocol, or a record is obtained from a second computing device using information in the request to enable the first computing device to locate a third computing device that communicates between VOP networks. The third computing device is a member of a second provider packet network. A communication between the first computing device and the third computing device is provided to establish the VOP session without using the PSTN.

In yet another aspect, a system for establishing inter-vendor and inter-carrier voice over packet (VOP) calls without using a public switched telephone network (PSTN) is provided that includes a computing device in a service provider network operable to receive a called party's email address from a calling party, to perform a query of the email address to obtain a record of other computing devices in other service provider networks, to communicate with the other computing devices using the record to request a VOP session with the called party's email address, and to provide for the establishment of the VOP session with the other computing devices without traversing the PSTN.

In yet another aspect, a system for establishing inter-vendor and inter-carrier voice over packet (VOP) calls without using a public switched telephone network (PSTN) is provided that includes a first computing device, a second computing device, and a third computing device in communication in a packet network. The first computing device and third computing device communicate to establish a VOP session without using the PSTN. The first computing device operates as a member of a first service provider packet network to communicate between VOP networks and to receive a request to initiate the VOP session. The second computing device operates to obtain an IP address using information in the request to enable the first computing device to locate the third computing device. The third computing device operates as a member of a second service provider packet network to communicate between VOP networks.

In yet another aspect, VOP concurrency servers for establishing On-Net calling across service providers are provided that include the VOP concurrency servers respectively operating in service provider networks. The VOP concurrency servers operate to communicate with each other without traversing a PSTN, to function as media gateway controllers, to perform IP address registration, and to perform VOP call setup and tear down.

In yet another aspect, a system for establishing On-Net calling across service providers is provided that includes a client software operating on a computing device, a first server, a second server, and other servers in communication over a packet network. The client software operates to initiate a registration of a client's IP address with the first server, to receive a called party's email address to initiate a VOP session, and to perform codec conversion during the VOP session. The first server operates to register the client's IP address, to perform a query of the second server using the called party's email address to locate the other servers, and to communicate with the other severs to request the VOP session. The second server operates to provide location information on the other servers. The other servers operate to verify a registration of the called party's email address, to perform a VOP call setup and tear down, and to facilitate the VOP session.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

Figure 1:
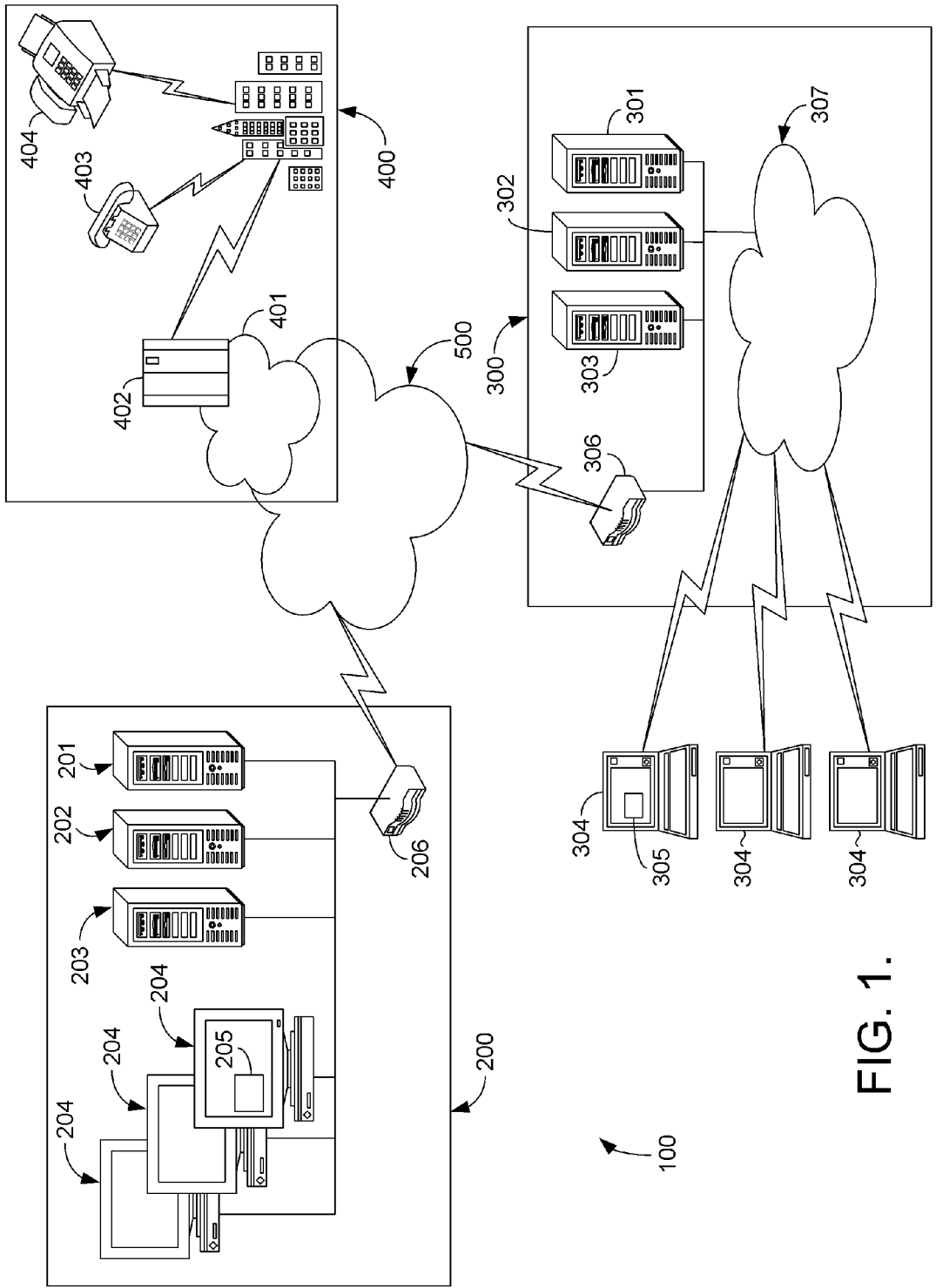
FIG. 1 is a block diagram of an exemplary operating network suitable for practicing an embodiment of the present invention.

The present invention will be better understood from the detailed description provided below and from the accompanying drawings of various embodiments of the invention, which describe, for example, a method and system for establishing inter-vendor and inter-carrier voice over packet (VOP) calls without using a public switched telephone network (PSTN). The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, an embodiment will now be referenced in connection with a computing network. Although the present invention can be employed in connection with a computing-network environment, it should not be construed as limited to the exemplary applications provided here for illustrative purposes.

Protocol Call Structure

With an implementation of the present invention, a user or a subscriber in one network, be it a service provider network or a corporate network, may make a VOP call to a user or a subscriber in another network without the VOP call traversing through the PSTN. In addition, the various users or subscribers may be members of different service provider networks and may communicate using existing email addresses.

In FIG. 1, a block diagram of an exemplary operating environment 100 is shown with a corporate network 200, a service provider 300, an Off-Net carrier 400, and an Internet 500. Corporate network 200 and service provider 300 illustrate an exemplary environment containing equipment that may be implemented to practice the present invention to provide VOP calls across different networks. The illustration is not meant to show the only means for practicing the present invention. Other equipment may added, subtracted, or combined to implement the preferences of an implementer of the present invention.

Corporate network 200 may include a VOP server 201, a DNS server 202, a mail server 203, a workstation 204, a client software 205, and a router 206. VOP server 201 may function as a media gateway controller and a register of client IP address information. Whenever a client accesses Internet 500, the client's IP address is recorded and maintained for a predetermined length of time. If the client either initiates a VOP call or receives a VOP call, VOP server 201 will act as the signaling agent between the VOP networks (shown as corporate network 200, service provider 300, and Off-Net carrier 400), performing call setup and tear down. If the called client cannot be reached or is not online, an embodiment of the present invention may implement VOP server 201 to provide voice mail services and forward a recording to the called client's registered email address. The voice mail may later be retrieved whenever the called client accesses their respective mail server.

DNS server 202 may be implemented to perform domain name lookups. An embodiment of the present invention is implemented to allow VOP calling using an email address. DNS server 202 may be used to look up a domain name and address of a VOP server of a called party using the email address of the called party. For example, if the email address of the called party is someone@somewhere.com, DNS server 202 would be accessed to locate a record for the VOP server for somewhere.com. In addition, DNS server 202 may respond with a series of records for somewhere.com identifying various signaling types that may be used to communicate between VOP server 201 and the far-end VOP server. The series of records may look something like the following in Table 1:

TABLE 1

A (address) Records

| Name | TTL | Class | Type | Data |
|---|---|---|---|---|
| sip.somewhere.com | 86400 | IN | A | 192.168.1.10 |
| h323.somewhere.com | 86400 | IN | A | 192.168.1.20 |
| megaco.somewhere.com | 86400 | IN | A | 192.168.1.30 |
| mgcp.somewhere.com | 86400 | IN | A | 192.168.1.40 |

Similar to a mail exchange record for email, a VOP service may require its own DNS record in DNS server 202. Mail exchange records provide host name and sort order for delivering email to domains. A similar voice exchange (VX) record may be created to direct incoming VOP calls to the appropriate VOP server. Due to the increasing number of VOP signaling protocols, a separate VX record may have to be defined for each signaling type. Examples of VX records include the following in Table 2.

TABLE 2

VX Record

| Name | Class | Type | Priority | Data |
|---|---|---|---|---|
| Sip | IN | VX | 10 | sip.somewhere.com |
| h323 | IN | VX | 10 | H323.somewhere.com |
| Megaco | IN | VX | 10 | megaco.somewhere.com |
| Mgcp | IN | VX | 10 | mgcp.somewhere.com |

Email server 203 may provide email distribution as is well known in the arts. In addition, it may also serve as a virtual answering machine for missed messages. A client may receive a voice mail message in the form of a .wav file delivered to the client's email address.

Workstation 204 provides the client with access to Internet 500. Workstation 204 provides an interface for a client to initiate a VOP call using client software 205 installed on workstation 204. Workstation 204 may be a computing device, a handheld device, a personal digital assistant (PDA) or other device that provides access to Internet 500. As shown in FIG. 1, corporate network 200 may contain various workstations similar to workstation 204.

Client software 205 provides interactions with the previously mentioned devices. Client software may be customized to operate with a specific service provider or integrated into an existing email software package. Client software 205 functions to register a client's IP address with VOP server 201 and performs VOP codec conversion to analog signals. Since there are numerous VOP codecs that may be selected, an embodiment of the present invention may implement downloadable codecs from content providers. An example of VOP codecs include G.711, G.729, G.728, G.726, and G.723 which are described in detail in the International Telecommunication Union (ITU), Telecommunication Standardization Sector (ITU-T).

For communications to occur between VOP networks, router 206 provide connections to Internet 500. Although one router is shown in corporate network 200, various routers may exist in corporate network 200 with connections to Internet 500. The idea here is to show a representation of the equipment that may be used to communicate and connect to various networks through Internet 500, and router 206 is one example.

Similar to corporate network 200, service provider 300 contains similar equipment that may be implemented to practice an embodiment of the present invention. Service provider 300 may include a VOP server 301, a DNS server 302, a mail server 303, a workstation 304, a client software 305, a router 306, and a private network 307. The functions described for VOP server 301, DNS server 302, mail server 303, workstation 304, client software 305, and router 306 may be found above respectively in VOP server 201, DNS server 202, mail server 203, workstation 204, client software 205, and router 206. Whereas workstation 204 may correlate to an employee of a company within corporate network 200, workstation 304 may correlate to a user or a subscriber that pays for interne or VOP access with service provider 300. Service provider 300's network is represented by private network 307.

One ordinarily skilled in the art may see that two users or two subscribers connected to service provider 300 through private network 307 may call each other over a VOP connection and stay within private network 307. However, with an implementation of an embodiment of the present invention, those users or subscribers may call other users in corporate network 200 over a complete VOP connection, or may call users associated with Off-Net carrier 400. Although the present invention provides users from different VOP networks to communicate without going through the PSTN, the present invention also implements access to users associated with an Off-Net carrier. Calls to users in Off-Net carrier 400 may use the PSTN by going through an Off-Net network 401 through an Off-Net VOP gateway 402 to telephonic devices 403 and 404.

Figure 2:
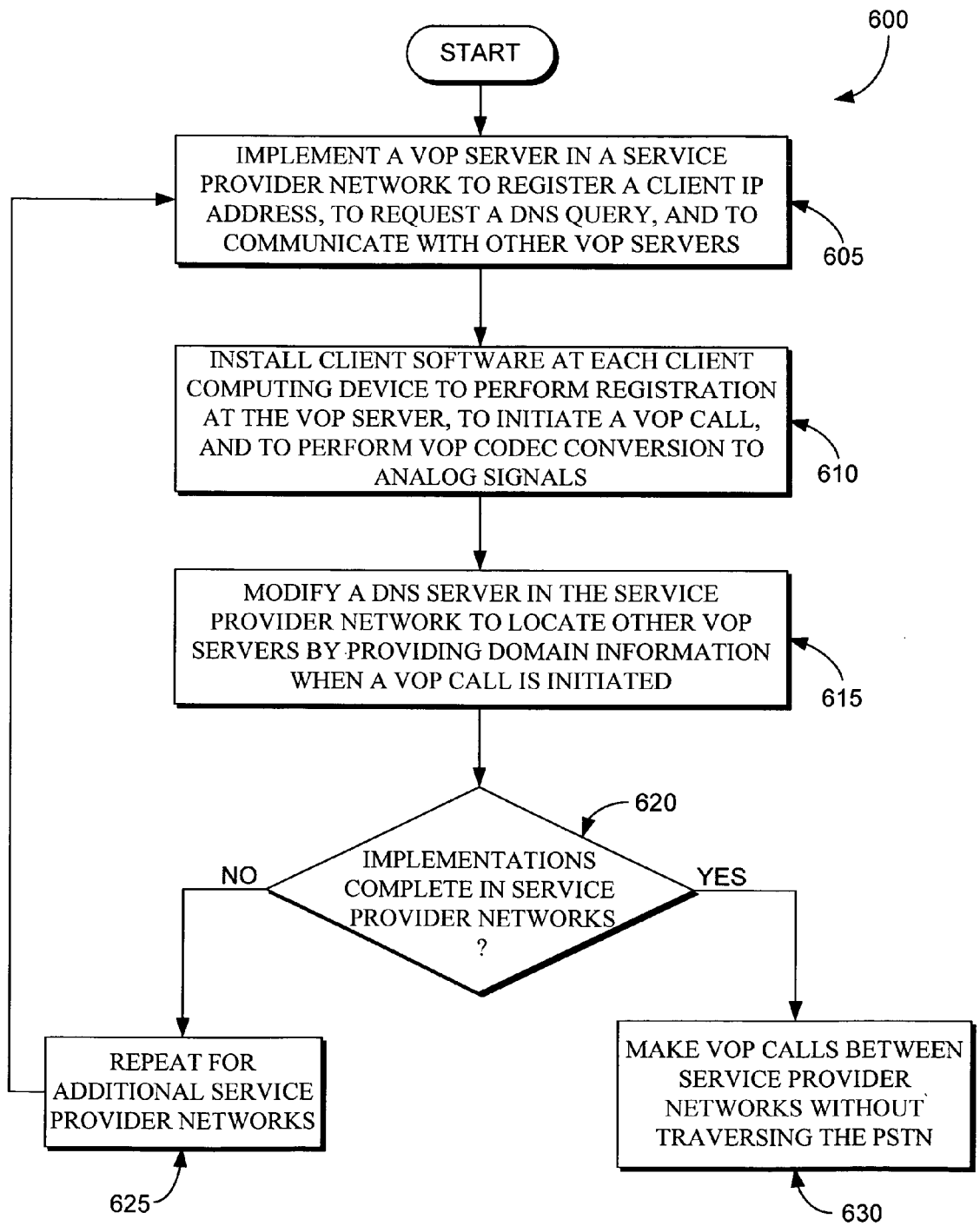
FIG. 2 is a flowchart of an exemplary process for implementing an embodiment of the present invention.

Turning now to FIG. 2, a method 600 is shown for implementing an embodiment of the present invention. In a step 605, a VOP server is implemented in a service provider network to register client IP addresses. Whenever a client desires to make a VOP call, that client will go through a registration process at the VOP server. The VOP server keeps track of clients that are located in the service provider network and provides authorization for access to make VOP calls. The VOP server also makes requests for DNS queries and communicates with other VOP servers. The VOP server was shown above in FIG. 1 as VOP servers 201 and 301.

In a step 610, client software, identified above as client softwares 205 and 305, is installed at each client computing device that operates within the service provider network and is used to make VOP calls. The client software performs registration at the VOP server. Whenever the client accesses the internet, the client software interacts with the VOP server to have the client registered at the VOP server. The client software also provides the interface for the client to initiate VOP calls and performs VOP codec conversion to analog signals. The VOP codec conversion provides a mechanism for the client to talk and listen to voice conversations during the VOP call.

As part of the implementation, a DNS server may be modified in the service provider network to locate other VOP servers in a step 615. The other VOP servers may be located by performing an address lookup of the called party's email address to return a domain name. With the domain name, information may be routed from an initiating VOP server to a far-end VOP server to establish a communication connection. The far-end VOP server may perform several functions including registration or verification of the called party.

In a step 620, a determination is made whether each service provider network has implemented the modifications to enable an embodiment of the present invention. If not, method 600 provides in a step 625 a repeat of the process for the additional service provider networks that need equipment modifications. Once the equipment is modified for the various service provider networks, VOP calls may occur between different clients within different service provider networks without traversing through the PSN as shown in a step 630.

Figure 3:
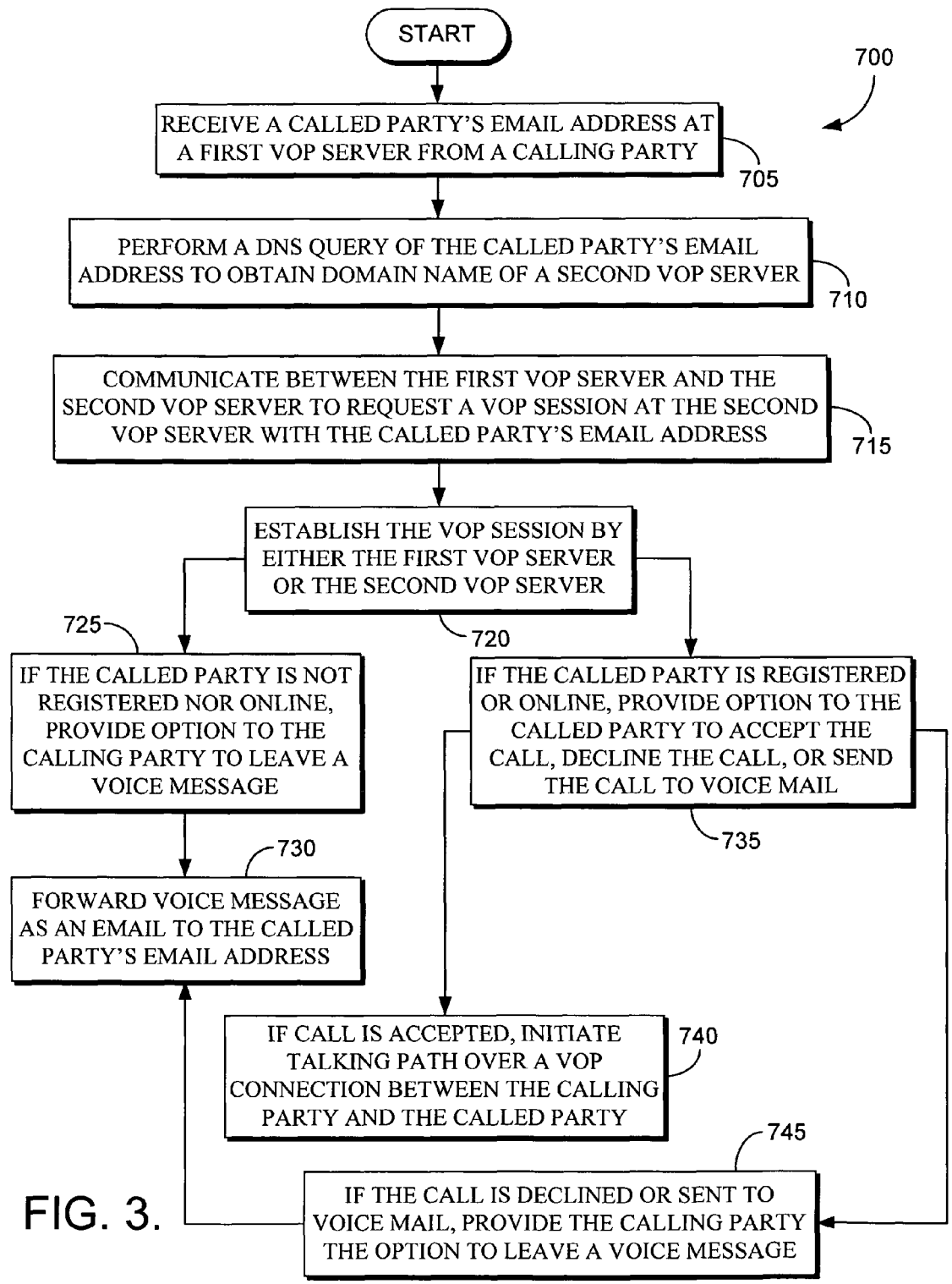
FIG. 3 is a flowchart of an exemplary process for establishing inter-vendor and inter-carrier VOP calls when practicing an embodiment of the present invention.

Turning now to FIG. 3, a process for establishing inter-vendor and inter-carrier VOP calls is provided in a method 700. In a step 705, a called party's email address is received at a first VOP server from a calling party. It is assumed in step 705 that the calling party has already been registered or is simultaneously being registered when the email address is received at the first VOP server. The first VOP server makes a requests to have a DNS query performed using the called party's email address to obtain domain information of a second VOP server, as shown in a step 710. The first VOP server routes information to a second VOP server based on the domain information that is received from the DNS server. The first VOP server communicates with the second VOP server to request a VOP session using the called party's email address in a step 715. The VOP session is established between the first VOP server and the second VOP server in a step 720.

Once the VOP session is establish, several options may occur for either the calling party or the called party. In a step 725, if the called party is not registered or online, an option may be provided for the calling party to leave a voice message. Once the voice message is created, it is forwarded to the called party's email address in a step 730. In a step 735, if the called party is registered or online, an option may be provided to the called party to either accept the call, decline the call, or send the call to voice mail. If the called party accepts the call in a step 740, the called party and the calling party may talk over a VOP connection between themselves. If the called party declines the call or send the call to voice mail as shown in a step 745, the calling party may have the option to leave the voice message, similar to step 725. Any voice message that is created will be forwarded to the called party's email address in step 730. One ordinarily skilled in the art understands that an audio message may be delivered to the email address of a user in the form of a .wav file or other formats.

As embodiments of the present invention have been thoroughly discussed in the above figures, several scenarios shall be discussed to illustrate how the present invention may be used. These scenarios are by no means the only scenarios that may be implemented. However, they are provided to give a reader additional information into the present invention.

In a first scenario, a VOP client may register in advance before attempting to make a VOP call. The client accesses client software (205, 305) on a respective computing device (204, 304). The client may use a username and password to gain access or use an existing username and password from an email account. The client software contacts a VOP concurrency server (201, 301) with the client's IP address. The VOP concurrency server registers the client's IP address and associates it with the clients email address. The client is now registered in the VOP concurrency server. The VOP concurrency server may send out intermittent keep-alive packets to validate if the client is still online and reachable.

In a second scenario, a VOP client may desire to make a VOP call. As discussed in the first scenario, the client registers with the VOP concurrency server, if not performed in advance. The client, also known as a calling party, initiates a VOP call by placing a called party's email address into the client software. The client software contacts the VOP concurrency server and initiates a VOP call (705). The VOP concurrency server performs a DNS query against the called party's email address domain name (710). A DNS server (202, 302) returns a voice exchange (VX) record with an IP address of the called party's domain name. The VOP concurrency server contact's the called party's VOP concurrency server with the calling party's email address and requests a VOP session via an appropriate protocol (715, 720). The called party's VOP concurrency server searches for or verifies the called party's email address and determines whether the called party has a currently registered IP address. If the called party is registered, then the called party's VOP concurrency server sends a notification to the called party's client software with the calling party's email address and waits for a response (735).

If the called party is not registered nor online, the called party's VOP concurrency server may return a reply to the calling party's VOP concurrency server with a voice message response (725). If the calling party desires to leave a voice message, then the calling party's VOP concurrency server may forward the calling party to the called party's VOP concurrency server. The calling party may record a voice message which will be forwarded by the called party's VOP concurrency server to the called party's email server (203, 303) as an email (730). At this point, either the called party's VOP concurrency server or the calling party's VOP concurrency server may terminate the call.

If the called party is registered and online, the called party may received an indication from the called party's VOP concurrency server that an incoming call is available. The called party may either accept the call, decline the call, or send the call to voice mail (735). If the called party accepts the call, the calling party and the called party may begin the talking process (740). For the talking process, the client software at the calling party and the called party may negotiate a VOP protocol to use. Either party may terminate the call as dictated by their respective client software and VOP concurrency server.

If the called party desires to decline the call or send the call to voice mail, the calling party may leave a voice message in a similar fashion as discussed above when the called party is not registered nor online (725, 745). Once the voice message is created, it is delivered to the called party's email address as discussed above (730).

In a third scenario, a VOP client may desire listen to voice mail messages received from other parties. The client may login to an email server (203, 303) using either a standardized email software or a customized version. The client may download email messages as dictated by the email software. The client may receive voice mail messages that are delivered in the form of email messages. The client may open the email and listen to a .wav file or other audio format file to hear the voice message.

In a final scenario, a VOP client may desire to reach a party that has a standard PSTN telephone number. The client software may be created to allow the client to input a telephone number to reach an Off-Net service provider (400). The Off-Net service provider's information may be located in the VOP concurrency server and/or the DNS server. Whenever the VOP concurrency server receives a telephone number to be dialed, the Off-Net carrier is contacted. The telephone number is forwarded to the Off-Net carrier's VOP gateway (402) for transit to complete the call.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for establishing inter-vendor and inter-carrier voice over packet (VOP) calls without using a public switched telephone network (PSTN), comprising:
receiving a called party's email address from a calling party over an email network at a computing device that provides voice services in a service provider network;
initiating a request by the computing device to have a query of the email address performed by a domain name system (DNS) server to obtain a record of another computing device that includes the called party's email address, wherein the another computing device is located respectively in another service provider network, wherein the record is an entry in a table, wherein the record comprises an internet protocol (IP) address, a domain name, and a VOP protocol, wherein the another computing device provides voice services with voice exchange records, wherein the voice exchange records are located in a table where each voice exchange record identifies a unique signaling protocol that is used in a VOP call, and wherein the voice exchange records are used to direct incoming VOP calls to an appropriate VOP server;
with the computing device, communicating with the another computing device using the record to request a VOP session with the called party's email address; and
establishing the VOP session between the computing device and the another computing device without traversing the PSTN, wherein establishing the VOP session comprises forwarding the calling party to the another computing device to leave a voice message, recording the voice message at the another computing device, and sending the voice message to the called party's email address,
wherein each of the computing device and the another computing device has a processor coupled to a memory.

2. The method of claim 1, wherein performing the query of the email address comprises performing a DNS server lookup.

3. The method of claim 1, wherein establishing the VOP session comprises:
notifying the called party of a call from a calling party;
at least one of accepting the call, declining the call, and sending the call to voice mail; and
if the call is accepted, continuing the call between the calling party and the called party.

4. The method of claim 3, wherein continuing the call comprises implementing a VOP protocol between the calling party and the called party for the call.

5. The method of claim 1, further comprising locating the called party's email address at the another computing device, and if not located at the another computing device, registering the called party's email address.

6. A computer-readable medium having instructions stored thereon and executed for performing the method of claim 1.

7. A method for establishing inter-vendor and inter-carrier voice over packet (VOP) calls without using a public switched telephone network (PSTN), comprising:
receiving a request from a calling party to initiate a VOP session at a first computing device that communicates between VOP networks, the first computing device being a member of a first service provider packet network and the first computing device provides voice services with voice exchange records, wherein the voice exchange records are located in a table where each voice exchange record identifies a unique signaling protocol that is used in a VOP call, and wherein the voice exchange records are used to direct incoming VOP calls to an appropriate VOP server;
obtaining an internet protocol (IP) address, a domain name, a VOP protocol, and a record from a domain name system (DNS) server using an information in the request to enable the first computing device to locate a second computing device that communicates between VOP networks, the second computing device being a member of a second service provider packet network and the second computing device provides voice services; and
providing for a communication between the first computing device and the second computing device to establish the VOP session without using the PSTN wherein providing for the communication comprises forwarding a calling party to the second computing device to leave a voice message for a called party, recording the voice message at the second computing device, and sending the voice message to the called party's email address,
wherein each of the first computing device and the second computing device has a processor coupled to a memory.

8. The method of claim 7, wherein receiving the request comprises at least one of receiving an email address to be called, receiving a first data to register a client information at the first computing device, and receiving a second data to verify an existence of the client information at the first computing device.

9. The method of claim 7, further comprising locating a called party's information at the second computing device.

10. The method of claim 7, wherein providing for the communication between the first computing device and the second computing device to establish the VOP session comprises:
notifying a called party of a call from a calling party;
at least one of accepting the call, declining the call, or sending the call to voice mail; and
if the call is accepted, continuing the call between the calling party and the called party.

11. The method of claim 10, wherein continuing the call comprises implementing a VOP protocol between the calling party and the called party for the call.

12. A computer-readable medium having instructions stored thereon for performing the method of claim 7.

13. A system for establishing inter-vendor and inter-carrier voice over packet (VOP) calls without using a public switched telephone network (PSTN), comprising:
a computing device in a service provider network operable to receive a called party's email address from a calling party over an email network, to initiate a request to have a query of the email address performed by a domain name system (DNS) server to obtain a record of another computing device in another service provider network; to communicate with the another computing device using the record to request a VOP session with the called party's email address, and to provide for the establishment of the VOP session with the another computing device without traversing the PSTN, wherein the calling party is forwarded to the another computing device to leave a voice message, the voice message is recorded at the another computing device, and the voice message is sent to the called party's email address, wherein the record is an entry in a table and comprises an internet protocol (IP) address, a domain name, and a VOP protocol, wherein the computing device provides voice services, wherein the another computing device provides voice services with voice exchange records, wherein the voice exchange records are located in a table where each voice exchange record identifies a unique signaling protocol that is used in a VOP call, wherein the voice exchange records are used to direct incoming VOP calls to an appropriate VOP server, and wherein each of the computing device and the another computing device has a processor coupled to a memory.

* * * * *